United States Patent
Morin et al.

(10) Patent No.: US 6,354,616 B1
(45) Date of Patent: Mar. 12, 2002

(54) ENHANCED LOADING FLOOR FOR A FUNERAL VEHICLE

(75) Inventors: Robert L. Morin, Glen Allen, VA (US); Rick Gullette, Lima, OH (US); Owen Ziessler, Bluffton, OH (US); Chuck Spees, III, Lima, OH (US)

(73) Assignee: Accubuilt, Inc., Lima, OH (US)

( * ) Notice: Subject to any disclaimer, the term of this patent is extended or adjusted under 35 U.S.C. 154(b) by 0 days.

(21) Appl. No.: 09/413,338

(22) Filed: Oct. 12, 1999

(51) Int. Cl.$^7$ .................................................. B60G 3/01
(52) U.S. Cl. ........................ 280/124.147; 280/124.155; 280/788; 29/401.1
(58) Field of Search ................... 280/124.147, 124.146, 280/124.145, 124.155, 781, 788, 124.134; 296/198, 195; 29/401.1

(56) References Cited

U.S. PATENT DOCUMENTS

| | | | |
|---|---|---|---|
| 1,627,833 A | | 5/1927 | Chandler |
| 3,913,932 A | * | 10/1975 | Guerriero et al. ....... 280/124 A |
| 3,944,245 A | * | 3/1976 | Kuhn .......................... 280/708 |
| 4,342,146 A | * | 8/1982 | Hanson ........................ 29/416 |
| 4,768,274 A | | 9/1988 | Pinnow et al. .............. 29/401.1 |
| 5,016,911 A | * | 5/1991 | Takehara et al. ............ 280/708 |
| 5,035,462 A | * | 7/1991 | Page et al. ................... 296/183 |
| 5,553,911 A | * | 9/1996 | Bodin et al. ................. 296/190 |
| 5,570,653 A | * | 11/1996 | Gere et al. ................... 114/270 |
| 5,580,121 A | * | 12/1996 | Dange et al. ............... 296/186 |
| 5,785,345 A | * | 7/1998 | Barlas et al. ................ 280/715 |
| 6,045,317 A | * | 4/2000 | Boucher et al. ............ 414/495 |
| 6,053,269 A | * | 4/2000 | Patten ........................ 180/167 |
| 6,135,470 A | * | 10/2000 | Dudding .............. 280/124.128 |
| 6,209,205 B1 | * | 4/2001 | Rumpel et al. ............ 29/897.2 |

* cited by examiner

Primary Examiner—J. J. Swann
Assistant Examiner—J. Allen Shriver
(74) Attorney, Agent, or Firm—Troxell Law Office PLLC

(57) ABSTRACT

A load carrying vehicle, such as a funeral vehicle, is disclosed having a vibration damper with a first end attached to the vehicle body at a first lateral distance from a longitudinal centerline of the vehicle body and a second end movably attached to a suspension member which, in turn, is movably attached to the vehicle body. The load carrying vehicle also includes a load carrying floor mounted to the vehicle body and located above the attachment of the first end of the vibration damper to the vehicle body, the load carrying floor having a side edge located at a second lateral distance from the longitudinal centerline of the body, such that the second lateral distance is greater than the first lateral distance. Thus, the side edge of the load carrying floor extends laterally outwardly of the attachment of the first end of the vibration damper to the vehicle body.

15 Claims, 4 Drawing Sheets

ENHANCED LOADING FLOOR FOR A FUNERAL VEHICLE

BACKGROUND OF THE INVENTION

This invention relates to a load carrying vehicle, such as a funeral vehicle, having a loading floor with an enhanced width to maximize the load carrying potential of the vehicle within the boundaries of the external vehicle structure.

Load carrying vehicles, such as funeral vehicles, are well-known in the art and are typically constructed by converting a sedan or station wagon type of vehicle into a vehicle having a body which bounds a load carrying space. In a funeral vehicle, this load carrying space accommodates a casket, flowers, or other items associated with a funeral. During the conversion, it is necessary to install a load carrying floor within the load carrying space of the vehicle body to support the rather substantial weight of the casket. It is, of course, desirable to achieve the maximum load carrying space within the confines of the exterior surface of the vehicle body.

Vehicle bodies typically have inner fender panels which define an inner surface of the wheel wells which accommodate the rear wheels and various suspension components of the vehicle. The tire width and the suspension geometry often dictate that the inner fender panels protrude inwardly into the load carrying space of the vehicle body to accommodate wheel and suspension component movement. The protrusion of the inner fender panels often determines the maximum width of the load carrying floor which can be installed in the vehicle body.

The protrusion of the inner fender panels into the load carrying space of the vehicle body may be worsened by the mounting of a vibration damper between the suspension and the vehicle body. Vibration dampers are typically referred to as "shock absorbers", or "shock struts" (when they also form a suspension member) and serve to dampen the vibratory oscillations of the vehicle suspension. In order to achieve the proper ride and handling characteristics of a vehicle, the vibration dampers typically have a lower end attached to a movable suspension component and an upper end attached to the inner fender panel of the vehicle body. In order to achieve the proper ride and handling characteristics, the upper attaching points of the vibration dampers are located inwardly toward the centerline of the vehicle, such that the vibration dampers have longitudinal axes that are angled inwardly toward a vertical plane passing through the longitudinal centerline of the vehicle. This desirable orientation of the vibration dampers necessitates the protrusion of the inner fender panels further into the load carrying space, thereby minimizing the width of the load carrying floor.

It is known to enhance the width of the loading floor of a funeral vehicle by altering the orientation of the vibration dampers from their inwardly angled positions to vertical positions by changing the mounting location of the upper attachments of the vibration dampers. However, while this technique achieves an increase in width of the loading floor, it also changes the suspension geometry of the vehicle, thereby changing its ride and handling characteristics.

Thus, there is believed to be a need for a load carrying vehicle, such as a funeral vehicle, having an enhanced loading floor with a maximized width, while at the same time incurring minimal changes to the suspension geometry of the vehicle to maintain the ride and handling characteristics of the vehicle.

SUMMARY OF THE INVENTION

A load carrying vehicle, such as a funeral vehicle, is disclosed having a vibration damper with a first end attached to the vehicle body at a first lateral distance from a longitudinal centerline of the vehicle body and a second end attached to a suspension member which, in turn, is movably attached to the vehicle body. The load carrying vehicle also includes a load carrying floor mounted to the vehicle body and located above the attachment of the first end of the vibration damper to the vehicle body, the load carrying floor having a side edge located at a second lateral distance from the longitudinal centerline of the body, such that the second lateral distance is greater than the first lateral distance. Thus, the side edge of the load carrying floor extends laterally outwardly of the attachment of the first end of the vibration damper to the vehicle body.

This invention also relates to a load carrying vehicle, such as a funeral vehicle, having an opening through each of the inner fender panels and a cross-member attached to the vehicle body in a load carrying space, the cross-member extending across the load carrying space between the inner fender panels and having a vibration damper mounting portion aligned with each of the openings in the inner fender panels.

More specifically, the invention relates to a funeral vehicle for transporting a casket or the like having a vehicle body bounding an elongated casket carrying space with inner fender panels located on the opposite lateral sides of the casket carrying space, and opening through each of the inner fender panels, a cross-member attached to the vehicle body in the casket carrying space and extending across the space between the inner fender panels, the cross-member having a vibration damper mounting portion aligned with the openings in each of the inner fender panels. The funeral vehicle also has a casket carrying floor with a casket carrying surface above the vibration damper mounting portions of the cross-member with opposite side edges of the casket carrying surface located laterally outwardly of the vibration damper mounting portions of the cross-member.

The present invention also encompasses a method of increasing the width of a load carrying surface in a vehicle body with a rear suspension including vibration dampers. The method includes the steps of removing the first vibration dampers from the vehicle, removing a portion of each inner fender panel including the attachment points for the first vibration dampers to create an opening through each of the inner fender panels, attaching a cross-member to the vehicle body such that the cross-member extends across the vehicle body between the inner fender panels and has vibration damper attachment portions aligned with the openings in the inner fender panels, attaching second vibration dampers between the suspension member and the attachment portions of the cross-member, and mounting a load carrying floor having a load carrying surface in the vehicle body such that the load carrying surface is located above the vibration damper attachment portions and opposite lateral side edges of the load carrying surface are located a greater distance from a longitudinal centerline of the vehicle body than are the attachment portions attaching the vibration damper to the cross-member.

DETAILED DESCRIPTION OF THE PREFERRED EMBODIMENTS

Figure 1:
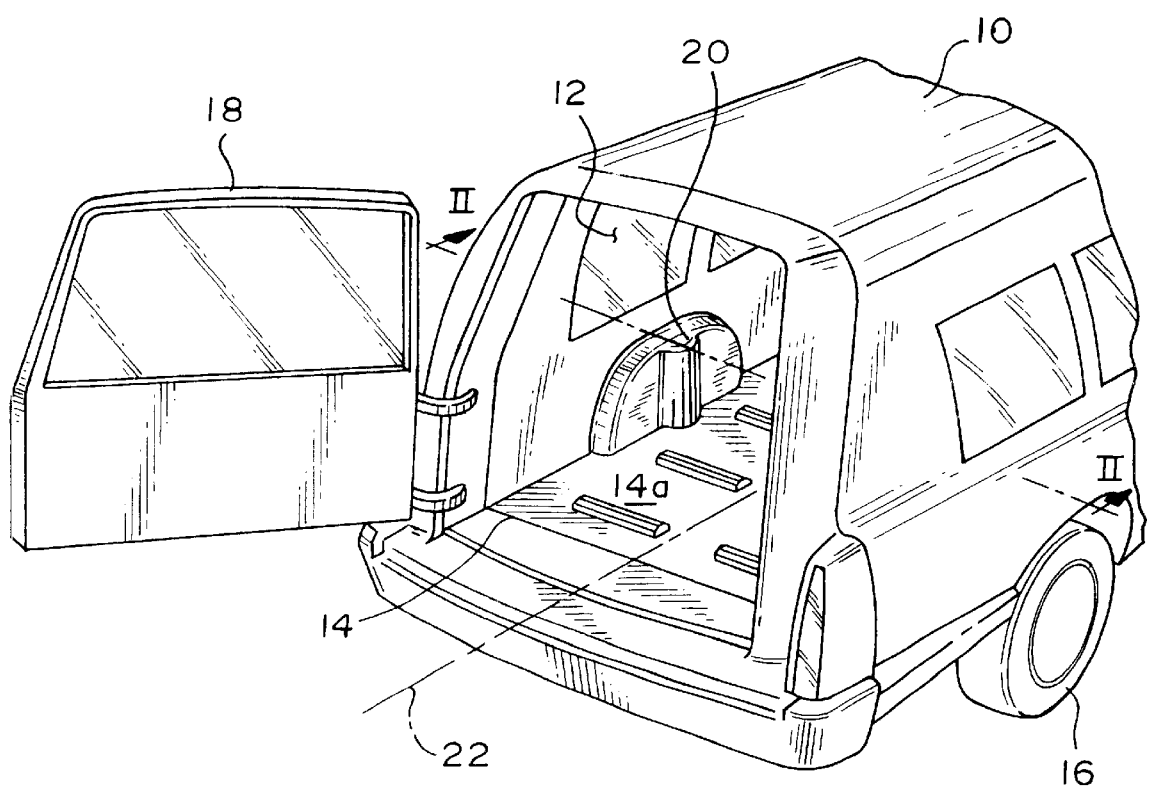
FIG. 1 is a partial, perspective view of a known funeral car illustrating the protrusion of the inner fender panels into the load carrying space.

A known load carrying vehicle, in this particular instance a funeral vehicle, is illustrated in FIG. 1. The vehicle comprises a vehicle body 10 bounding an interior load or casket carrying space 12 having a load carrying floor 14 with a load carrying surface 14a. In known fashion, the vehicle body 10 is supported by rear wheels 16 which are movably attached to the vehicle body 10 by a suspension system. The load, or casket, carrying space 12 has an ingress/egress opening at a rear end thereof, which opening may be closed by a door 18 attached to the vehicle body 10.

Figure 2:
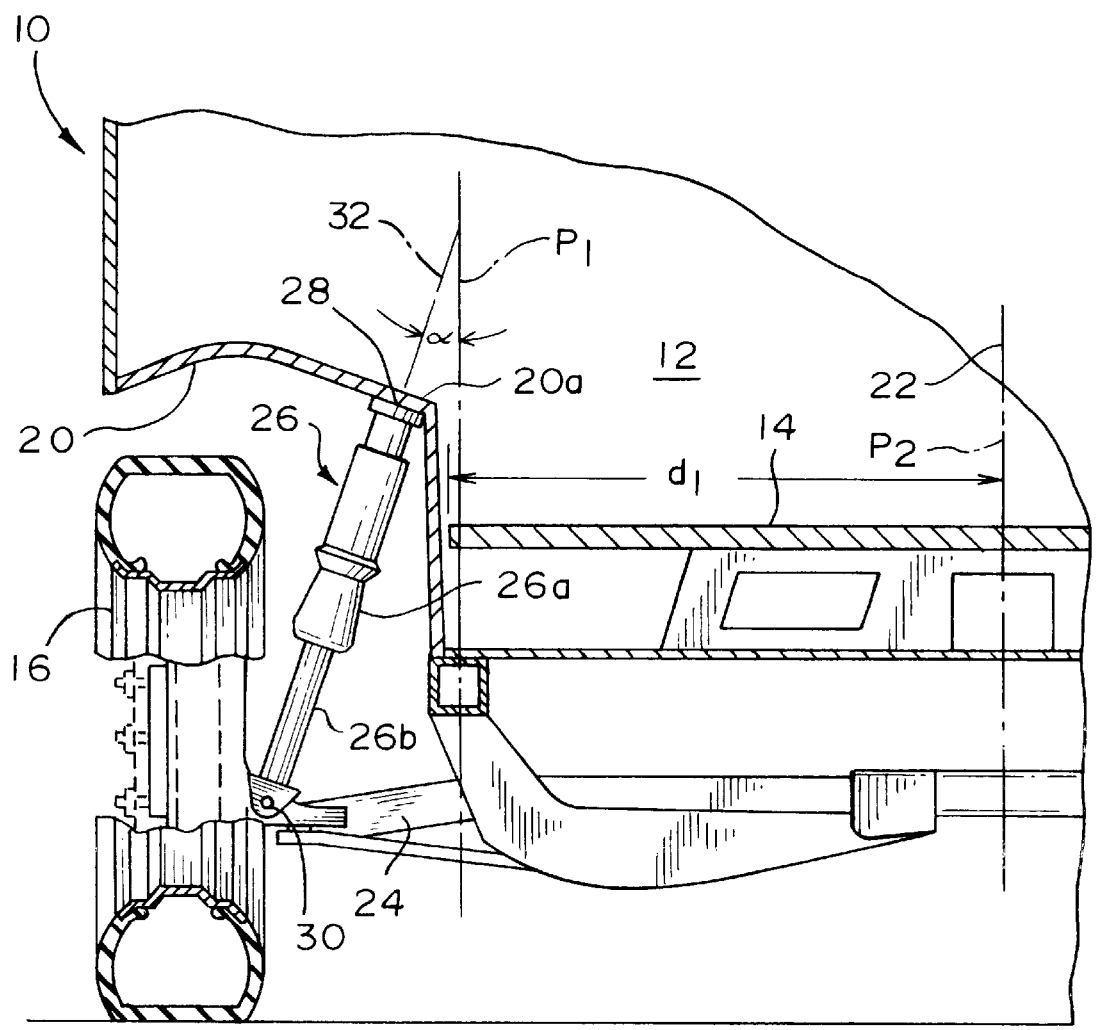
FIG. 2 is a partial, cross-sectional view taken along lines II—II in FIG. 1.

The vehicle body 10 includes inner fender panels 20 spaced apart laterally equidistantly from the longitudinal centerline 22 of the vehicle body 10. As can be seen in FIG. 2, the inner fender panels 20 extend inwardly into the load carrying space 12 to facilitate movement of the wheel 16 which is connected to the vehicle body 10 by one or more suspension members 24 and a vibration damper 26. Vibration damper 26 comprises, in known fashion, a means for damping the oscillations of the suspension system, including suspension member 24 and wheel 16, relative to the body 10. Commonly these devices are referred to as "shock absorbers", or "shock struts" (when the damper also forms a suspension member). It is to be understood that the use of the term "vibration damper" includes elements commonly known as "shock absorbers" and "shock struts".

Typically, vibration damper 26 includes a first, upper portion 26a that is attached to the vehicle body 10, usually to the inner fender panel 20 and a second, lower portion 26b that is attached to a movable suspension component or the wheel hub and which is capable of moving relative to first portion 26a. In order to provide the proper ride and handling characteristics to the vehicle, the attachment 28 of the upper portion 26a to the inner fender panel 20 is located laterally inwardly of the second attachment 30 attaching the second portion 26b to the movable suspension of the vehicle. Thus, the longitudinal centerline 32 of the vibration damper 26 is oriented at an angle α relative to plane $P_1$ which is parallel to $P_2$, a plane which extends vertically through the longitudinal centerline of the vehicle. As can be seen in FIG. 2, this orientation of the vibration dampers 26, while improving the ride and handling characteristics of the vehicle, causes the inner fender panel 20, including the vibration damper mounting portion 20a, to protrude inwardly into the load, or casket, carrying space 12, thereby limiting the maximum width of the load carrying floor 14. The maximum distance between a lateral side edge 14b of the load carrying surface 14a and the plane $P_2$ is illustrated as $d_1$ in FIG. 2. While other portions of the load carrying floor 14, at other longitudinal locations in the load carrying space 12, may be wider, the distance $d_1$ determines the maximum width of load, or casket, which can be longitudinally placed in the load carrying space 12.

Quite obviously, it is desirable to maximize the width of the load carrying surface 14a. However, it is equally desirable to do so without changing the geometry of the suspension components, including that of the vibration dampers 26, so as not to alter the ride and handling characteristics of the vehicle. The present invention provides a solution to this seemingly insolvable puzzle.

Figure 3:
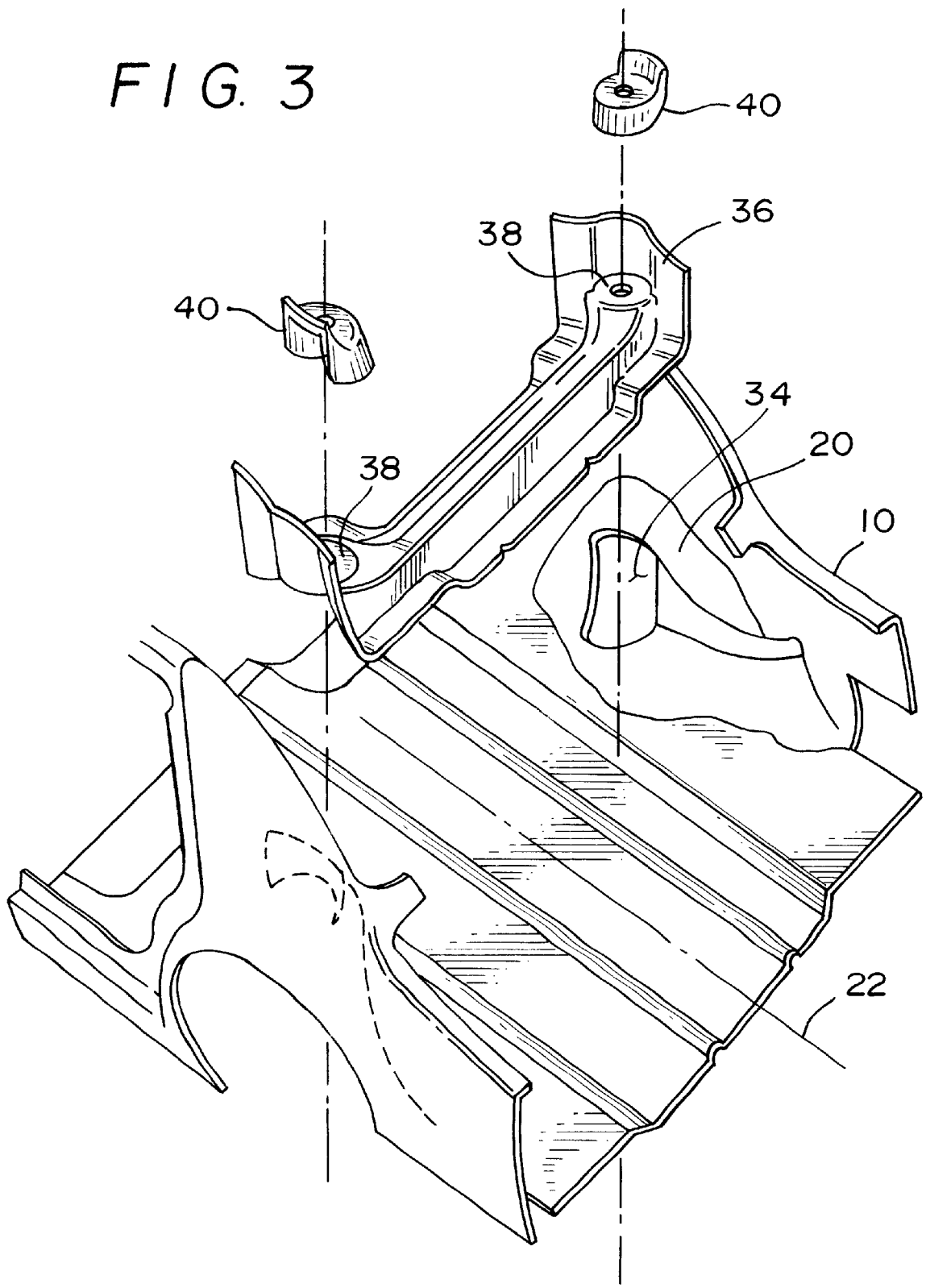
FIG. 3 is a partial, exploded, perspective view illustrating a vehicle body modified according to the present invention.

As best illustrated in FIG. 3, the vibration dampers 26 are removed from the vehicle and a portion of each inner fender panel 20 is removed, this portion including the attachment portion 28 where the original vibration damper 26 was attached to the inner fender panel 20, thereby forming an opening 34 in each of the inner fender panels 20. A cross member 36, including new vibration damper mounting portions 38 is rigidly attached to the vehicle body, such as by welding, or the like, such that the cross member extends laterally across the vehicle body between the inner fender panels 20, the orientation of the cross member 36 being generally transverse to the longitudinal center axis 22 of the vehicle body 10. The vibration damper mounting portions 38 are aligned with each of the openings 34. Reinforcing members 40 may be attached to the top or the bottom of the cross member 36 at the vibration damper mounting portions 38 to provide increased structural rigidity to the mounting portions 38.

Figure 4:
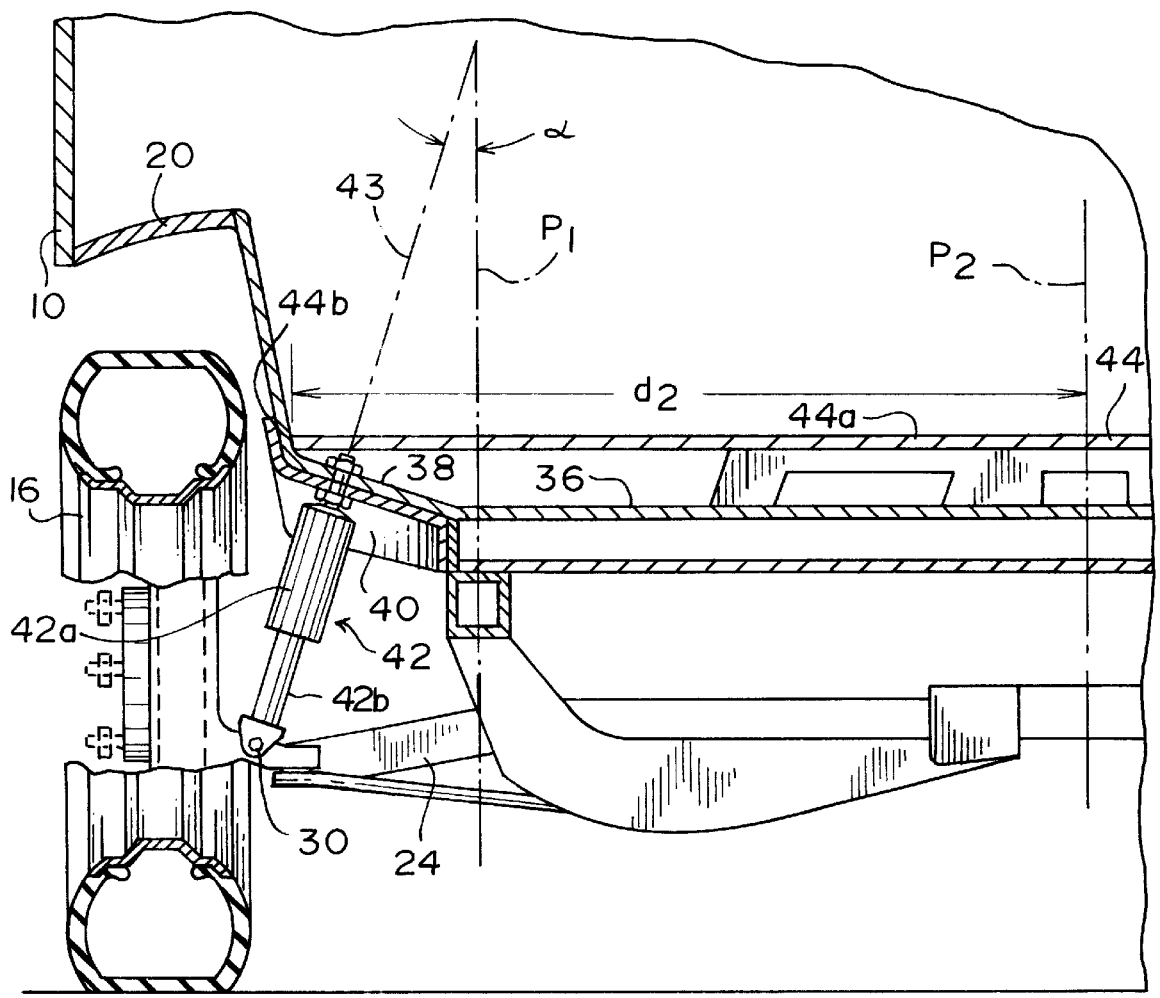
FIG. 4 is a cross-sectional view, similar to FIG. 2, illustrating the load carrying vehicle according to the present invention.

After the cross-member 36 has been rigidly fixed in position, new vibration dampers 42 may be installed. As best illustrated in FIG. 4 the distance between the mounting point 30 of the lower portion of the vibration damper and the new vibration damper mounting portions 38 is significantly less than the distance between attachment 30 and the original vibration damper mounting portion 28. This requires the use of a vibration damper 42 having a shorter overall length than vibration damper 26. However, the longitudinal center line 43 of the vibration damper 42 is still oriented at angle α relative to plane $P_1$ which extends parallel to a vertical plane passing through the longitudinal centerline of the vehicle, identified as plane $P_2$ in FIG. 4. In known fashion, vibration damper 42 comprises an upper portion 42a which is attached to vibration damper mounting portion 38 and a lower portion 42b which is attached to the movable suspension 10 components at attachment 30. If the lower attachment point of the vibration damper 42 is physically different from that of the original vibration damper 26, an adapter plate can be utilized such that the lower portion 42b may be attached to the same attachment 30 as was vibration damper 26.

By removing a portion of the inner fender panels 20 and lowering the upper attachment point of the vibration dampers, a load, or casket, carrying floor 44 may be installed, the floor 44 having a load, or casket, carrying surface 44a and lateral side edges 44b. The lateral side edges 44b are each located a distance $d_2$ from plane $P_2$, which distance is greater than distance $d_1$ illustrated in FIG. 2. Thus, the overall width of the load carrying floor 44 may be increased without alteration of the suspension geometry of the vehicle.

The foregoing description is presented for illustrative purposes only and should not be construed as in anyway limiting this invention, the scope of which is defined solely by the appended claims.

We claim:

1. A funeral vehicle for transporting a casket or the like comprising:
    a) a vehicle body bounding an elongated casket carrying space having a casket ingress/egress opening at one end thereof, the vehicle body having inner fender panels located on opposite lateral sides of the casket carrying space;
    b) an opening through each of the inner fender panels;
    c) a cross-member attached to the vehicle body in the casket carrying space, the cross-member extending across the casket carrying space between the inner fender panels and having a vibration damper mounting portion aligned with the opening in each of the inner fender panels; and, d) a casket carrying floor located in the casket carrying space, the floor having a casket carrying surface above the vibration damper mounting portions of the cross-member with opposite side edges of the casket carrying space located laterally outwardly of the vibration damper mounting portions of the cross-member.

2. The funeral vehicle of claim 1, further comprising:
a) at least one vehicle suspension member movably connected to the vehicle body; and,
b) at least one vibration damper having a first end attached to one of the vibration damper mounting portions of the cross-member and a second end attached to the at least one suspension member, the attachment of the first end of the at least one vibration damper being located laterally inwardly from one of the side edges of the casket carrying space.

3. The funeral vehicle of claim 1, wherein the casket carrying surface is substantially planar.

4. The funeral vehicle of claim 1, wherein the attachment of the second end of the at least one vibration damper is located laterally outwardly of the attachment of the first end of the at least one vibration damper to the vibration damper mounting portion of the cross-member.

5. The funeral vehicle of claim 1, further comprising a reinforcing member attached to the cross-member at each vibration damper mounting portion.

6. A load carrying vehicle having a vehicle body bounding a load carrying space with inner fender panels located on opposite lateral sides of the load carrying space, the vehicle comprising:
a) an opening through each of the inner fender panels;
b) a cross-member attached to the vehicle body in the load carrying space, the cross-member extending across the load carrying space between the inner fender panels and having a vibration damper mounting portion aligned with each of the openings in the inner fender panels, each vibration damper mounting portion having a mounting hole;
c) a reinforcing member attached to the cross-member at each vibration damper mounting portion; and,
d) a load carrying floor located in the load carrying space above the vibration damper mounting portions of the cross-member, the load carrying space having opposite side edges located laterally outwardly of the vibration damper mounting holes.

7. The load carrying vehicle of claim 6, wherein the load carrying floor has a substantially planar load carrying surface.

8. The load carrying vehicle of claim 6, further comprising:
a) at least one vehicle suspension member movably connected to the vehicle body; and,
b) at least one vibration damper having a first end attached to one of the vibration damper mounting portions of the cross-member at the vibration damper mounting holes, and a second end attached to the at least one suspension member.

9. The load carry vehicle of claim 8, wherein the load carrying floor is substantially planar.

10. The load carrying vehicle of claim 8, wherein the attachment of the second end of the at least one vibration damper is located laterally outwardly of the attachment of the first end of the at least one vibration damper to the vibration damper mounting portion of the cross-member.

11. A load carrying vehicle having a vehicle body bounding a load carrying space with inner fender panels located on opposite lateral sides of the load carrying space, the vehicle comprising:

a) an opening through each of the inner fender panels;
b) a reinforcing member having a vibration damper mounting hole aligned with each of the openings in the inner fender panels; and,
c) a load carrying floor located in the load carrying space above the vibration damper mounting portions, the load carrying space having opposite side edges located laterally outwardly of the vibration damper mounting holes.

12. The load carrying vehicle of claim 11, further comprising:
a) at least one vehicle suspension member movably connected to the vehicle body; and,
b) at least one vibration damper having a first end attached to one of the vibration damper mounting portions of the cross-member at the vibration damper mounting hole and a second end attached to the at least one suspension member.

13. A method of increasing a load carrying width of a vehicle body having laterally spaced apart inner fender panels, a rear suspension, and first vibration dampers attached to each inner fender panel at first attachment points and to the rear suspension at second attachment points, the first and second attachment points being spaced apart a first distance, comprising the steps of:
a) removing the first vibration dampers from the vehicle;
b) removing a portion of each inner fender panel including the first attachment points to create an opening through each inner fender panel;
c) attaching a cross-member to the vehicle body such that the cross-member extends across the vehicle body between the inner fender panels, the cross-member having a third vibration damper attachment point aligned with the opening in each inner fender panel, the third attachment points being spaced from the second attachment points a second distance which is less than the first distance;
d) attaching second vibration dampers between each second and third attachment points; and,
e) mounting a load carrying floor having a load carrying surface in the vehicle body, such that the load carrying surface is located above the third attachment points and such that opposite lateral side edges of the load carrying surface are located a greater distance from a longitudinal centerline of the vehicle body than are the third attachment points.

14. The method of claim 13, wherein the first vibration dampers each have a longitudinal centerline extending at a first oblique angle relative to a vertical plane passing through the longitudinal centerline of the vehicle body and comprising the additional step of locating the third attachment points such that the second vibration dampers each have a longitudinal centerline extending at a second oblique angle relative to the vertical plane passing through the longitudinal centerline of the vehicle body wherein the second oblique angle is substantially equal to the first oblique angle.

15. The method of claim 13 comprising the additional step of attaching a reinforcing member to the cross-member adjacent to each of the third attaching points prior to attaching the second vibration dampers.

* * * * *